United States Patent [19]
Gatellier

[11] Patent Number: 6,062,193
[45] Date of Patent: May 16, 2000

[54] PROCESS FOR CONTROLLING THE QUANTITY OF FUEL INJECTED INTO A DIESEL ENGINE

[75] Inventor: Bertrand Gatellier, Boulogne, France

[73] Assignee: Institut Francais du Petrole, Rueil-Malmaison, France

[21] Appl. No.: 08/940,011

[22] Filed: Sep. 29, 1997

[30] Foreign Application Priority Data

Sep. 27, 1996 [FR] France ................................ 96 11985

[51] Int. Cl.$^7$ .............................. F02B 3/12; F02D 41/14
[52] U.S. Cl. ........................................... 123/299; 123/435
[58] Field of Search ..................... 123/299, 456, 123/447, 300, 435

[56] References Cited

U.S. PATENT DOCUMENTS

| | | | |
|---|---|---|---|
| 4,513,714 | 4/1985 | Dolenc et al. | 123/357 |
| 4,928,653 | 5/1990 | Ohkubo et al. | 123/435 |
| 4,951,631 | 8/1990 | Eckert | 123/446 |
| 5,070,836 | 12/1991 | Wahl et al. | 123/299 |
| 5,080,068 | 1/1992 | Sawamoto | 123/435 |
| 5,229,945 | 7/1993 | Demizu et al. | 364/431 |
| 5,402,760 | 4/1995 | Takeuchi et al. | 123/300 |
| 5,474,045 | 12/1995 | Demizu et al. | 123/418 |
| 5,623,412 | 4/1997 | Masson et al. | 364/431.03 |

FOREIGN PATENT DOCUMENTS

| | | |
|---|---|---|
| 0539921 | 5/1993 | European Pat. Off. . |
| 2277173 | 10/1994 | United Kingdom . |

*Primary Examiner*—Andrew M. Dolinar
*Assistant Examiner*—Mahmoud M Gimie
*Attorney, Agent, or Firm*—Antonelli, Terry, Stout & Kraus, LLp

[57] ABSTRACT

A process for controlling the quantity of fuel injected into a diesel engine comprising at least one cylinder includes the steps of determining the pressure variation ($\Delta P$) within at least one cylinder around a specific time of the engine cycle, for two successive cycles ($C_1$, $C_2$) having different injection characteristics; deducing therefrom the difference between the quantity of fuel actually injected into the cylinder and a theoretical quantity of fuel; and adjusting the injection parameters so as to balance in real time the quantity of fuel actually injected with the quantity of fuel that is to be theoretically injected. The process is preferably implemented during stabilized running of the engine.

20 Claims, 5 Drawing Sheets

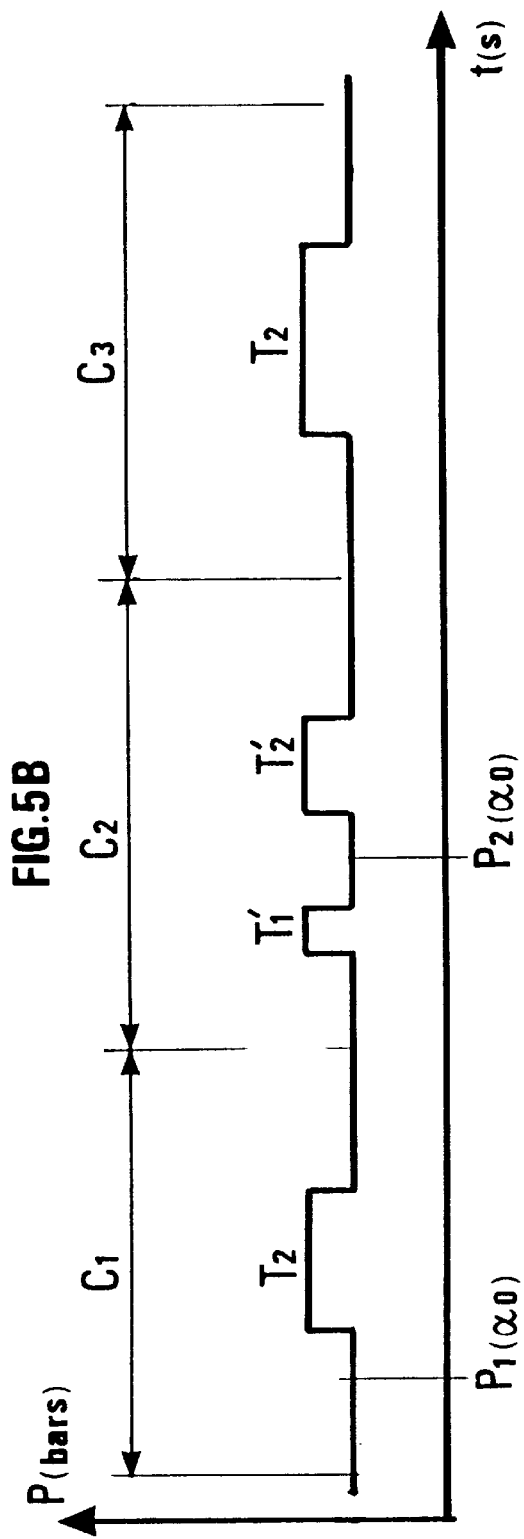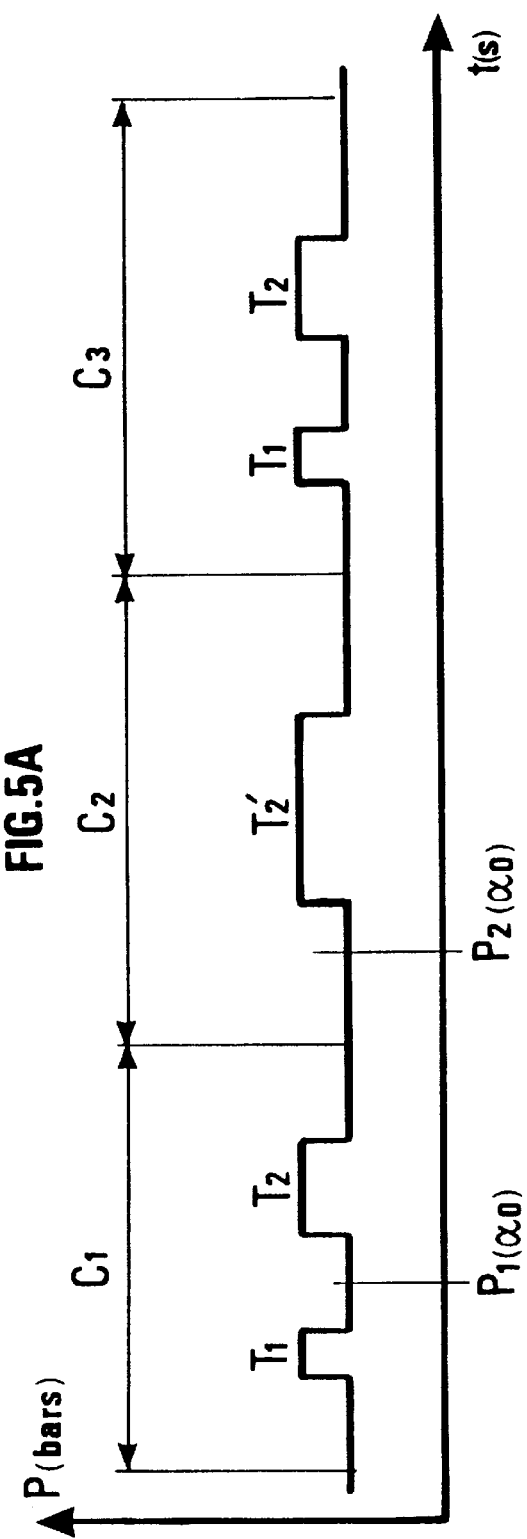

PROCESS FOR CONTROLLING THE QUANTITY OF FUEL INJECTED INTO A DIESEL ENGINE

FIELD OF THE INVENTION

The present invention relates to the field of diesel engines and more particularly to the control of the injection in such engine types.

It is well-known to associate with an engine one or more detectors intended to measure several parameters so as to better control the running thereof. These detectors can be pressure detectors allowing to measure the pressure within the chambers and outside, temperature detectors, injection needle lift detectors, etc.

It is also well-known to perform, by means of a computer, predetermined adjustments on an engine by transferring the information provided by the detectors to stored standard configurations. These standard configurations are referred to as "maps" by specialists. For this process to be effective, many detectors have to be used and complex charts of standard configurations relating to very diverse running conditions have to be "mapped".

Furthermore, fuel injection is a decisive operation in the running cycle of engines. This is the reason why many studies have focused on injection improvement via notably more effective control.

Injection control becomes a particularly delicate operation when high pressures, sometimes above 1200 bars, are required for injection into the cylinders. The most recently developed injectors work at such pressures, for example in direct-injection diesel engines.

Under such conditions, it is difficult to provide proper control of the quantity of fuel injected. It is notably difficult to provide a good distribution of the fuel in each of the cylinders. This distribution does not only condition the total fuel consumption, the combustion quality and therefore the pollution generated, but it also influences the driving convenience.

BACKGROUND OF THE INVENTION

The well-known methods allowing to improve the injection distribution cylinder by cylinder are based on a correction of the engine torque via analysis of the instantaneous crankshaft rotating speed taken in each cylinder. Document Toyota SAE 930 873 describes such a method.

The problem is even more acute when small fuel quantities are to be controlled, such as for example small fuel injections taking place before the main injection in direct-injection diesel engines. These pre-injections are referred to as "pilot injections" by specialists and will be thus called in the text hereafter.

These small injections allow to improve the combustion noise of the pollutant emissions.

Document FR-2,704,023 describes a way of controlling this injection type from quasi-zero pilot injections until detectable pre-injection values are obtained.

SUMMARY OF THE INVENTION

According to the invention, injection control can thus be achieved via control of the pilot injection and/or of the main injection into at least one of the engine cylinders, in real time, in a different and advantageous way.

In other words, the object of the invention is to control the quantity of fuel injected into a diesel engine.

The main stages of the invention can consist in:
(a) determining the pressure variation within at least one cylinder around a specific time of the engine cycle, for two successive cycles having different injection characteristics;
(b) deducing therefrom the difference between the quantity of fuel actually injected into said cylinder and a theoretical quantity of fuel;
(c) adjusting the injection parameters so as to balance in real time the quantity of fuel actually injected with the quantity of fuel to be theoretically injected.

According to the invention, the process is preferably implemented during stabilized running of the engine.

The process according to the invention can be implemented independently for each cylinder of the engine.

According to one of the embodiments of the invention, the process is implemented for one cylinder and the other cylinders are adjusted in the same way.

More precisely, the absolute value of the pressure variation between a cycle having a fuel pre-injection prior to the main injection and a cycle having only a main fuel injection is determined.

The quantity of pre-injected fuel is advantageously adjusted.

A computer is preferably used to implement the process, said computer allowing real-time adjustment of the quantity of fuel injected.

According to one of the aspects of the invention, stage (b) is carried out by means of data stored in said computer.

Furthermore, according to the invention, stage (c) is carried out by means of data stored in said computer by possibly using a correction self-adjustment process.

According to the invention, the quantity of mainly injected fuel can also be adjusted. This can be achieved by means of a relation stored in the computer between adjustment of the pre-injected quantity and that of the mainly injected quantity.

Said pressure variation is advantageously determined around the combustion top dead center.

According to an embodiment example of the invention, the process can be implemented with an injection system called "common rail"; an injection system comprising one pump injector per cylinder can also be used.

The process according to the invention also requires definition of particular times of the cycle such as, for example, the main injection start control time β; the time $\alpha_o$ must preferably be contained in a given range.

Furthermore, if the pressure variation (ΔP) is zero, the signal ($T_1$) relative to the quantity of pre-injected fuel is modified.

Besides, the present invention aims to modify the signal relative to the quantity of mainly injected fuel, which follows an adjustment of the injection parameters. The modified signal thus depends on the signal relative to the quantity of pre-injected fuel, on the signal linked with the quantity of mainly injected fuel and on the injection pressure.

A preferred application of the invention relates to direct-injection diesel engines.

BRIEF DESCRIPTION OF THE DRAWINGS

Other features, advantages and details of the invention will be clear from reading the description hereafter, given by way of non limitative examples, with reference to the accompanying drawings wherein.

DETAILED DESCRIPTION OF THE INVENTION

Figure 1:
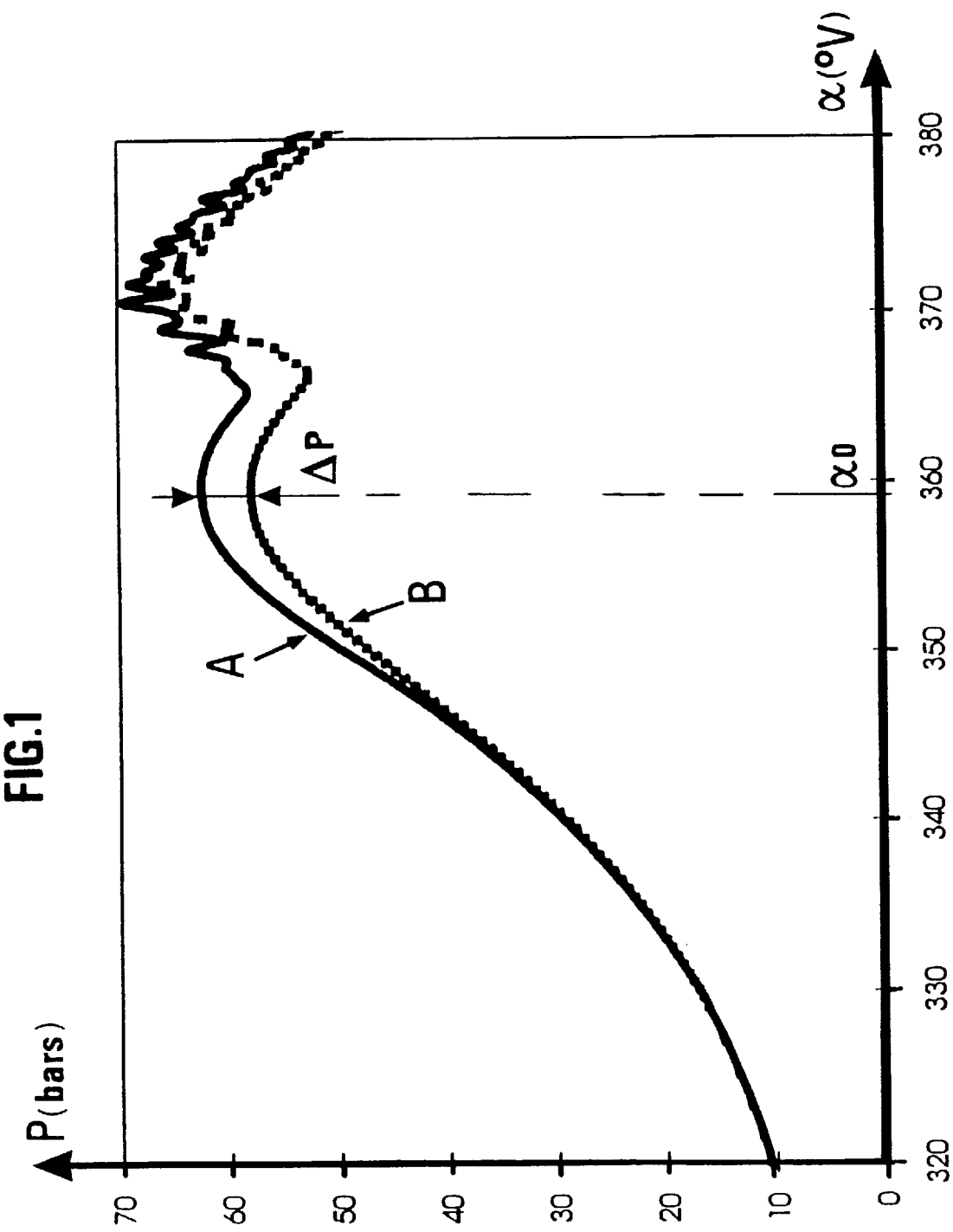
FIG. 1 relates to curves showing the cylinder pressures for cycles having different injection characteristics, around a given time of the engine cycle.

FIG. 1 shows experimental curves giving a relation between the cylinder pressure and the crankshaft angle. Curves A and B relate to different injection characteristics. In fact curve A relates to the pressure in a cylinder where a pilot injection takes place prior to the main injection, whereas curve B illustrates the pressure in a cylinder without pilot injection. A pressure variation $\Delta P$ can be seen between the two curves, this variation having a maximum value here around 360° crankshaft angle for the combustion top dead center. Around this characteristic point ($\alpha_o$), there is a good repeatability of the pressure variation for each injection type. Curves A and B are thus advantageously exploited to determine notably the pressure variation $\Delta P$ around a given crankshaft angle ($\alpha_o$).

Figure 2:
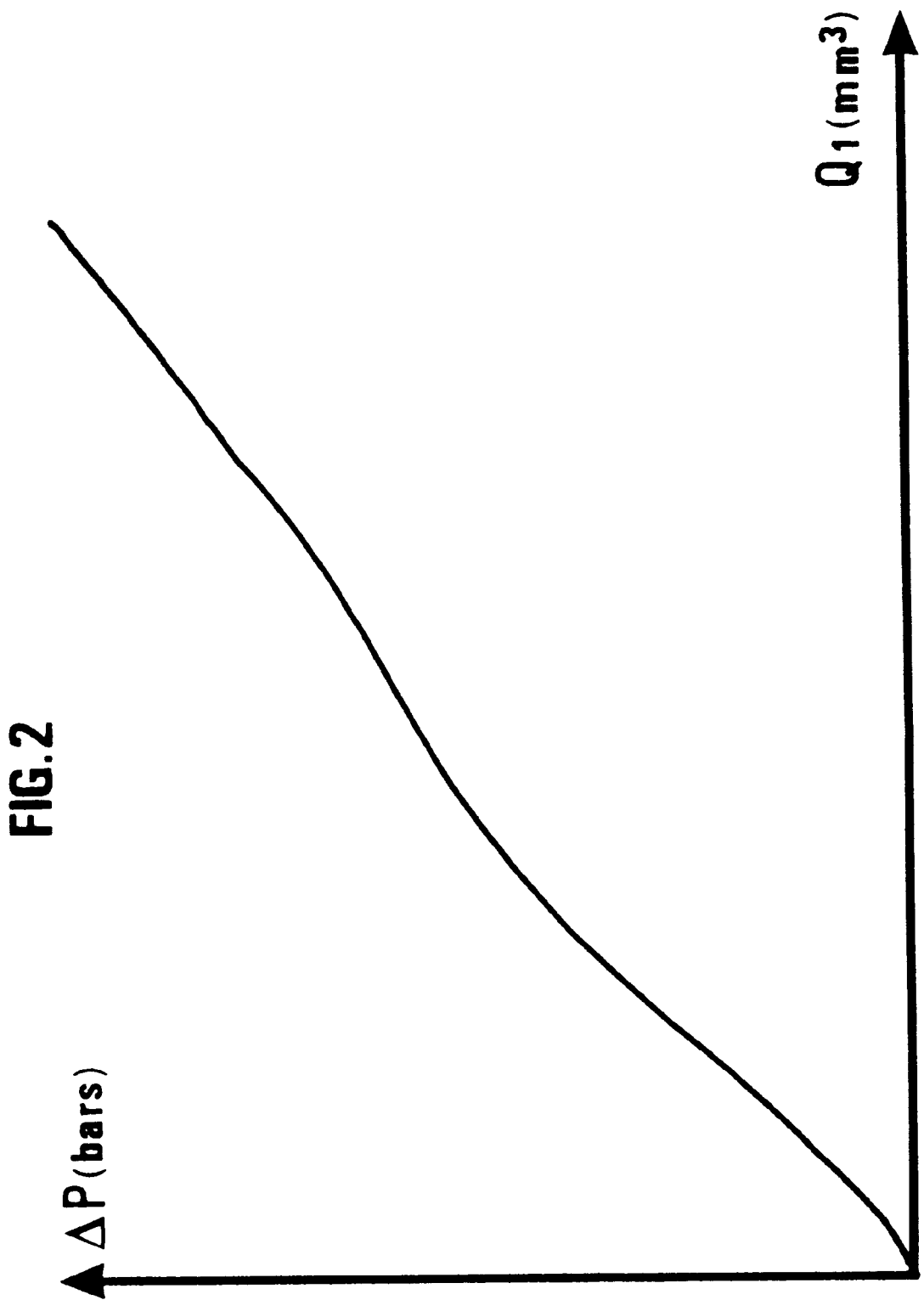
FIG. 2 is a curve defining the relation between the pressure variation according to FIG. 1 and the pilot quantity of fuel injected.

This data is then used as input data of a curve such as that shown in FIG. 2.

This quasi-linear curve establishes the relation between the pressure variation $\Delta P$ defined above and the quantity $Q_1$ of pilot-injected fuel, for a given speed and load. $\Delta P$ being known, the quantity $Q_1$ of injected fuel is deduced from this curve.

A single curve is shown in FIG. 2, but actually a pencil of curves which correspond each to a given speed and load can be exploited.

The curves of FIG. 2 are calculation charts stored in an associated computer. As explained hereafter, the latter will allow to control permanently and to calculate in real time the quantity of pilot-injected fuel and/or the total quantity of fuel injected into at least one cylinder of the engine.

Figure 3:
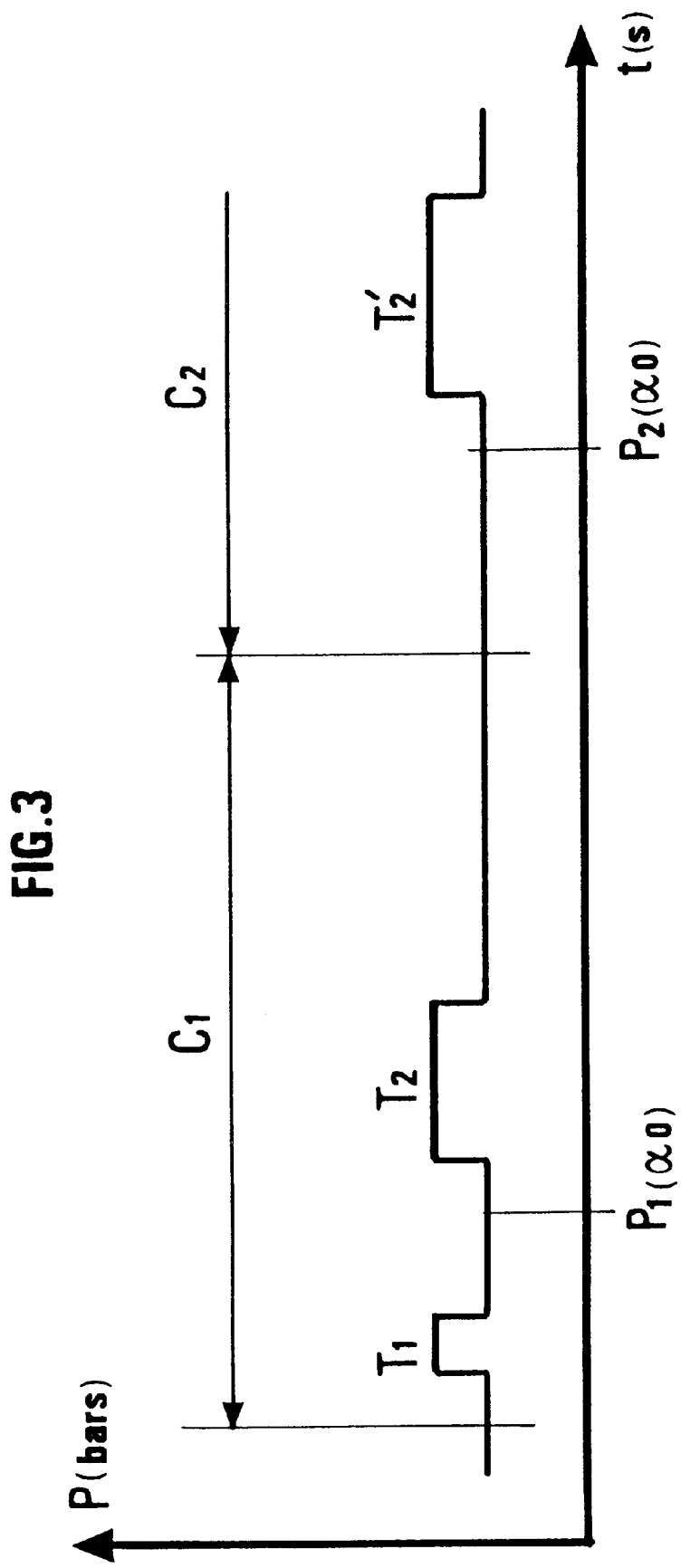
FIG. 3 illustrates an example of signals controlling the injection system, such as those delivered by the computer, according to the invention.
Figure 4:
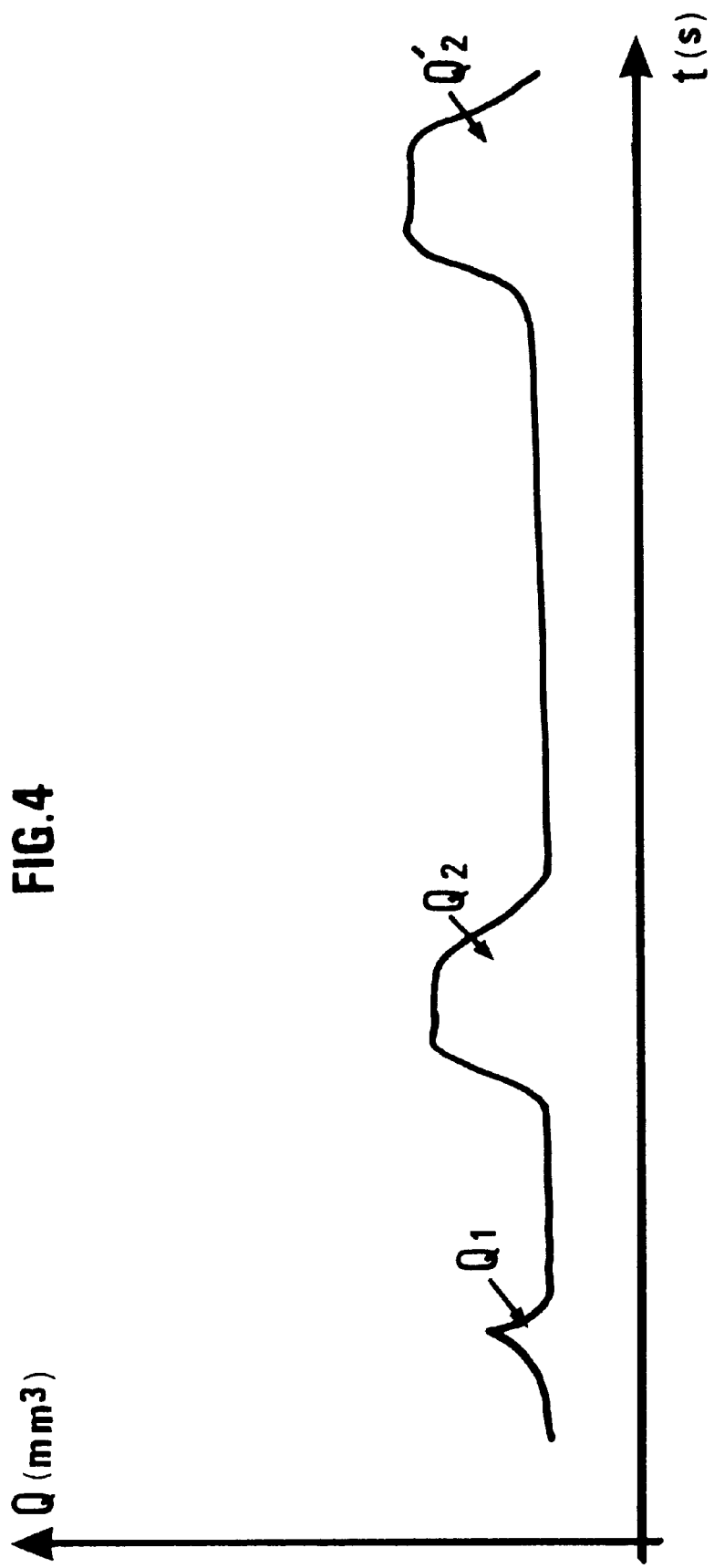
FIG. 4 illustrates the quantities injected with the control signals of FIG. 3, and FIGS. 5A and 5B show control signals for two different working instances.

FIGS. 3 and 4 illustrate the implementation of an embodiment of the invention with an injection system known as "common rail".

FIG. 3 shows the control signal delivered by the computer and obtained for two successive combustion cycles $C_1$ and $C_2$ in a cylinder. This signal represents the control time at a predetermined time of the cycle, for a given cylinder. Cycle $C_1$ comprises control of a pilot injection that is activated by slot $T_1$, followed by a main injection control corresponding to slot $T_2$. A pressure $P_1$ which is a function of $\alpha_o = P_1(\alpha_o)$ can be associated with this cycle. Cycle $C_2$ comprises no pilot injection, therefore only a slot $T_2$ of the signal appears. A corresponding pressure $P_2(\alpha_o)$ is measured. It can be noted that, according to this embodiment of the invention, a pressure detector is thus necessary for each cylinder.

The pressure difference $\Delta P = P_2(\alpha_o) - P_1(\alpha_o)$ can thus be quantified and the process according to the invention can be implemented so as to obtain the quantity of fuel injected: $Q_1$ as represented in FIG. 4.

The relation existing between $T^i_1$ and $Q^i_1$ can thus be determined for each cylinder (i).

It is then possible to correct $T^i_1$ for a later cycle in order to adjust the quantity $Q^i_1$ of fuel injected during the pilot injection to cylinder (i).

Moreover, this information obtained for cylinder (i) can be used to correct $T^i_2$ which is the main quantity of fuel to be injected into this cylinder.

In fact:

$$\begin{cases} T^i_1 = T_1(\text{base}) + \delta T^i_1 \\ T^i_2 = T_2(\text{base}) + \delta T^i_2 \end{cases}$$

The values $T_1(\text{base})$ and $T_2(\text{base})$ are stored in the computer, in the form of maps, as a function of the load and/or the position of the pedal and of the engine speed.

Furthermore, the function relating $\delta T^i_2$ to $\delta T^i_1$ is previously determined by any means known in the art. This function is also preprogrammed in the computer:

$$\delta T^i_2 = f(\delta T^i_1).$$

The present invention thus allows to correct not only the control time $T^i_1$ by means of a quasi-instantaneous real-time calculation, but also the control time $T^i_2$ for a given cylinder (i).

The controlled quantities really injected can be adjusted to the preprogrammed quantities.

The embodiment of the invention that has just been described requires one pressure detector per cylinder so as to be able to adjust the quantity injected for each cylinder individually, by implementing the process separately in each cylinder.

The advantage of this solution lies in the precision and in the reliability of the adjustment which notably takes account of the wear and/or of the fouling specific to each injector.

Without departing from the scope of the present invention, a single pressure detector can be used and the same adjustment can be performed while considering that the various cylinders and injectors are identical and therefore work quite similarly.

As mentioned above, the injection system can be a system known as "common rail" where the injection pressure is common to all the cylinders.

However, without departing from the scope of the invention, the injection system can comprise one pump injector per cylinder. The signals are then processed as mentioned above.

A characteristic element of the invention concerns the start (or phasing) of the main fuel injection. This time is the control time of signal $T_2$ (or $T'_2$).

Besides, another important element for implementing the process according to the invention is the selection of the crankshaft angle $\alpha_o$ at which the pressures $P_1$ and $P_2$ are measured. The example of FIG. 1 was obtained for $\alpha_o = 360°$, the combustion top dead center. More generally, $\alpha_o$ must be selected prior to any energy release due to the main injection and after the end of the energy release linked with the pilot injection. It must be selected at a time of the cycle when the repeatability of the pressure curves $P_1$ and $P_2$ is good.

In cases where the difference $\Delta P$ between pressures $P_1$ and $P_2$ is below a threshold ($\Sigma$), for example because $T_1$ is not significant enough, the pilot injection control system is increased stepwise until a pressure difference $\Delta P$ above threshold ($\Sigma$) is obtained in order to be able to implement the process described above.

As described above, the process according to the invention can be implemented when there is at least one cycle having a pilot injection followed by a main injection. This succession can be associated with the normal running of the engine. FIG. 5A illustrates the corresponding injection control signals. In this instance, a cycle ($C_2$) having only a main injection thus has to be created according to the invention between two cycles ($C_1$, $C_3$) corresponding to the normal running.

In order that this modification does not cause too great a work variation between two cycles, it will be attempted for example to balance the injected quantities. To that effect, signal $T_2$ relative to the single main injection will be modified to $T'_2$.

The modification can be advantageously preprogrammed in the computer in the form of a preprogrammed function $T'_2=f(T_1, T_2, P_{inj})$. Thus, according to signals $T_1$ and $T_2$ and to injection pressure $P_{inj}$, a particular value will be assigned to $T'_2$.

Conversely, the normal running may not be provided with a pilot injection, as illustrated in FIG. 5B where a normal cycle basically comprises a single (main) fuel injection. Introduction of a cycle with pilot injection can thus vary the work provided at each cycle. In order to minimize this work variation and to obtain good driving convenience, signal $T'_2$ is applied in the modified cycle ($C_2$). Signal $T'_2$ can be a preprogrammed value as mentioned above: $T'_2=f(T_1, T_2, P_{inj})$.

It should however be underlined that, in this instance, the fact that no pilot injection is provided under normal running conditions does not mean that the control signal $T_1$ corresponding to the pilot injection is zero as in FIG. 5B. Signal $T_1$ may exist but it is then such that it does not lead to a pilot injection.

It will also generally be attempted to balance the quantities injected between the two cycles having different injection characteristics, so as to have $Q_1+Q_2=k$ constant.

More generally, the invention requiring in any case a modification of the normal running, said modification is preprogrammed in the computer in order to decrease the work variation resulting from the normal running modification.

I claim:

1. A process for controlling the quantity of fuel injected into a diesel engine comprising at least one cylinder, said process comprising:
   (a) determining the pressure variation ($\Delta P$) within at least one cylinder around a specific time within the engine cycle corresponding to a given crankshaft angle ($\alpha_o$), for two successive cycles ($C_1$, $C_2$) having different injection characteristics;
   (b) deducing therefrom the difference between the quantity of fuel actually injected into said cylinder and a theoretical quantity of fuel;
   (c) adjusting the injection parameters so as to balance in real time the quantity of fuel actually injected with the quantity of fuel to be theoretically injected.

2. A process as claimed in claim 1, including implementing said process during stabilized running of the engine.

3. A process as claimed in claim 1, including implementing said process independently for each cylinder of the engine.

4. A process as claimed in claim 1, wherein said engine has a plurality of cylinders and said process including implementing said process for one cylinder and adjusting the injection parameters for the other cylinders in the same way.

5. A process as claimed in claim 1, including using a computer to implement the process, said computer allowing real-time adjustment of the quantity of fuel injected.

6. A process as claimed in claim 5, including carrying out stage (b) by means of data stored in said computer.

7. A process as claimed in claim 5, including carrying out stage (c) by means of data stored in said computer.

8. A process as claimed in claim 1, wherein said pressure variation ($\Delta P$) is determined around the combustion top dead center.

9. A process as claimed in claim 5, wherein a signal ($T_2$) relative to the quantity of mainly injected fuel, that follows an adjustment of the injection parameters, is modified.

10. A process as claimed in claim 9, wherein a modified signal $T'_2$ depends on the signal $T_1$ relative to the quantity of pre-injected fuel, on the signal $T_2$ linked with the quantity of mainly injected fuel and on the injection pressure.

11. Application of the process as claimed in claim 1 to a direct-injection diesel engine.

12. A process for controlling the quantity of fuel injected into a diesel engine comprising at least one cylinder, said process comprising:
   (a) determining the pressure variation ($\Delta P$) within at least one cylinder around a specific time ($\alpha_o$) of the engine cycle, for two successive cycles ($C_1, C_2$) having different injection characteristics;
   (b) deducing therefrom the difference between the quantity of fuel actually injected into said cylinder and a theoretical quantity of fuel;
   (c) adjusting the injection parameters so as to balance in real time the quantity of fuel actually injected with the quantity of fuel to be theoretically injected, including implementing stage (c) by means of a self-adjustment process using a computer with data stored therein.

13. A process for controlling the quantity of fuel injected into a diesel engine comprising at least one cylinder, said process comprising:
   (a) determining the pressure variation ($\Delta P$) within at least one cylinder around a specific time ($\alpha_o$) of the engine cycle, for two successive cycles ($C_1$, $C_2$) having different injection characteristics;
   (b) deducing therefrom the difference between the quantity of fuel actually injected into said cylinder and a theoretical quantity of fuel;
   (c) adjusting the injection parameters so as to balance in real time the quantity of fuel actually injected with the quantity of fuel to be theoretically injected, wherein the absolute value of the pressure variation ($\Delta P$) between a cycle ($C_1$) having a main fuel injection and a fuel pre-injection before the main fuel injection and a cycle ($C_2$) having only a main fuel injection is determined.

14. A process as claimed in claim 13, wherein the quantity ($Q_1$) of pre-injected fuel is adjusted.

15. A process as claimed in claim 14, characterized in that the quantity of mainly injected fuel ($Q_2$) is also adjusted.

16. A process as claimed in claim 14, including adjusting the quantity ($Q_2$) of the main fuel injected by means of a relation stored in a computer between the adjustment of the pre-injected quantity ($Q_1$) and that of the mainly injected quantity ($Q_2$).

17. A process as claimed in claim 5, wherein a characteristic main fuel injection start control time ($\beta$) is defined.

18. A process as claimed in claim 13, wherein said specific time of the engine cycle is selected within a range contained between the end of the pilot injection and the start of the main injection that follows.

19. A process as claimed in claim 5, wherein when a absolute value of the pressure variation ($\Delta P$) is zero or quasi-zero, the signal ($T_1$) relative to the quantity of pre-injected fuel is modified.

20. Application of the process as claimed in claim 13 to a direct-injection diesel engine.

* * * * *